United States Patent
King et al.

(10) Patent No.: US 8,544,207 B2
(45) Date of Patent: Oct. 1, 2013

(54) HYDROPONIC PLANT GROWTH SYSTEMS WITH ACTIVATED CARBON AND/OR CARBONIZED FIBER SUBSTRATES

(75) Inventors: Mark J. King, Boulder, CO (US); Martin A. King, Montreal (CA)

(73) Assignee: Euteq LLC, Boulder, CO (US)

( * ) Notice: Subject to any disclaimer, the term of this patent is extended or adjusted under 35 U.S.C. 154(b) by 367 days.

(21) Appl. No.: 12/934,984

(22) PCT Filed: Mar. 13, 2009

(86) PCT No.: PCT/US2009/037172
§ 371 (c)(1),
(2), (4) Date: Dec. 3, 2010

(87) PCT Pub. No.: WO2009/154829
PCT Pub. Date: Dec. 23, 2009

(65) Prior Publication Data
US 2011/0120005 A1    May 26, 2011

Related U.S. Application Data (60) Provisional application No. 61/072,002, filed on Mar. 27, 2008.

(51) Int. Cl.
*A01G 31/00*      (2006.01)
(52) U.S. Cl.
USPC .................................. 47/59 S; 47/56; 47/63
(58) Field of Classification Search
USPC ..................... 47/56, 59 S, 62 N, 63
See application file for complete search history.

(56) References Cited

U.S. PATENT DOCUMENTS

| | | | |
|---|---|---|---|
| 3,053,775 A | 11/1959 | Abbott | |
| 3,991,514 A | 11/1976 | Finck | |
| RE34,162 E | 1/1993 | Boyd et al. | |
| 6,092,331 A | 7/2000 | Stoever | |
| 6,183,531 B1 | 2/2001 | De Groot et al. | |
| 7,217,346 B2 | 5/2007 | Iseki et al. | |
| 2003/0121798 A1 | 7/2003 | Iseki et al. | |
| 2006/0107590 A1* | 5/2006 | Kharazipour | 47/59 S |
| 2006/0112629 A1* | 6/2006 | Wright | 47/59 S |
| 2007/0021300 A1 | 1/2007 | Farant | |
| 2011/0120005 A1* | 5/2011 | King et al. | 47/62 N |

FOREIGN PATENT DOCUMENTS
WO    WO9114358 A2    10/1991

OTHER PUBLICATIONS

Thwe, et al., Effects of Environmental Aging on the Mechanical Properties of Bamboo-Glass Fiber Reinforced Polymer Matrix Hybrid Composites Part A: Applied Science and Manufacturing (2002) vol. 33, No. 1 pp. 43-52, abstract, title.

(Continued)

*Primary Examiner* — Frank T Palo
(74) *Attorney, Agent, or Firm* — Cochran Freund & Young LLC; James R. Young

(57) ABSTRACT

A method and apparatus for growing plants (P) hydroponically includes a plant substrate material (52, 54, 56) comprising activated carbon and/or carbonized fibers with or without additional, non-carbonated, non-activated cellulosic fibers. The activated carbon and/or carbonized fibers with or without the additional, non-carbonated, non-activated cellulosic fibers are usable in bulk or manufactured into slabs (56) or other configurations by any of a variety of non-woven, woven, molding, or other techniques. The activated carbon and/or carbonized fibers are made from cellulosic or synthetic carbon fibers, for example, bamboo fibers.

24 Claims, 3 Drawing Sheets

(56) References Cited

OTHER PUBLICATIONS

Phan, Production of Fibrous Activated Carbons from Natural Cellulose (jute, coconut) Fibers for Water Treatment Applications, Carbon (2006) vol. 44, pp. 2569-2577, abstract pp. 2570, in 1-3; pp. 2572, table 4, in 3; p. 2575, col. 2, para 3, ln 6.

Iyobe Tsutomu et al.; Comparison of Removal Efficiencies for Ammonia and Amine Gasses between Woody Charcoal and Activated Carbon; Journal of Health Science, vol. 50, No. 2; Jan. 14, 2004, pp. 148-153.

European Extended Search; May 6, 2013; pp. 1-8.

* cited by examiner

HYDROPONIC PLANT GROWTH SYSTEMS WITH ACTIVATED CARBON AND/OR CARBONIZED FIBER SUBSTRATES

This application claims the benefit of U.S. provisional patent application No. 61/072,002, filed on Mar. 27, 2008, which is incorporated herein by reference.

BACKGROUND OF THE INVENTION

1. Technical Field of the Invention

This invention is related to hydroponic plant growth systems, and more specifically to growing plants in a hydroponic growth medium or substrate comprising activated carbon fibers.

2. State of the Prior Art

Hydroponics is a method of growing plants by providing mineral nutrients from mineral nutrient solutions to plant roots instead of from soil. In general, there are two main types of hydroponics—solution culture hydroponics and medium culture hydroponics. Solution culture hydroponics does not use a solid medium or substrate for the roots, whereas medium culture hydroponics includes a solid medium or substrate for the plant roots. Solid medium cultures are generally categorized by the type of solid medium used, which broadly includes sand culture, gravel culture, and rock wool culture. Typical media used for solid medium hydroponic cultures include the following: (i) Diahydro, which is natural sedimentary rock that comprises fossilized remains of diatoms; (ii) Expanded clay, which comprises clay pellets that are fired in kilns to expand into porous particles; (iii) Coir or coco peat, which is the leftover material after the fibers have been removed from the outermost shell of the coconut; (iv) Mineral wool, which includes fibers made from minerals or metal oxides, including fiberglass, ceramic fibers, and rock wool, also known as stone wool, which is an inert substrate made by spinning molten rock or lava into masses of fine, intertwined fibers; (v) Perlite, which is volcanic rock that has been superheated into very lightweight, expanded glass pebbles; (vi) Vermiculite, which is another mineral that has been superheated to expand it into light pebbles; (vii) Sand; (viii) Gravel; (ix) Brick shards; and (x) Polystyrene.

Of the examples listed above, mineral wool, and especially rock wool, is one of the most widely used solid media in hydroponics, especially in commercial hydroponic plant growing operations, because of its ability to hold water and a high percentage of air at the same time, and it provides a good mechanical structure to hold the plant stable. However, it does have a high pH, which is generally not suitable for plant growth, so it usually requires some acidic conditioning, and, while its water retention capabilities compare favorably to the other example hydroponic media listed above, it must still be watered frequently, if not continuously. Manufacturers of rock wool and other mineral wools have tried to address this problem by forming denser material, but such modifications inhibit root penetration. Also, mineral wool is prone to dusting, and the fine dust particles are small enough to lodge in people's lungs, which is harmful and can cause cancer and other diseases. Compositing materials, such as phenyl formaldehyde or furan resin, have been used in efforts to improve the tensegrity and reduce brittleness of mineral wool materials, but some of the composites are hydrophobic and have to be treated, such as by addition of mineral wetting agents or surfactants, in order to be useful as a hydroponic plant substrate. However, such wetting agents can leach out of the mineral wool material, which decreases the hydrophilic properties of the mineral wool substrates, and some of them may have toxic effects.

There are also environmental costs inherent in the use of mineral wools for hydroponic substrate materials. For example, raw materials for rock wool have to be mined, and the temperatures for the manufacture of rock wool exceed 1,600° C., which requires high energy input. Also, rock wool factories exude large quantities of smoke that contain air pollutants in nearly every category of toxins, including radioactive materials, carcinogenic substances, and heavy metals, and the process consumes vast amounts of water. Another problem is that mineral wools do not compost or biodegrade, and, after use, most of it is hauled to landfills for disposal, which adds to the environmental problems.

SUMMARY OF THE INVENTION

It is an object of the present invention to provide a hydroponic plant support medium or substrate that is not only porous, but also has other advantages over mineral wools and other materials typically used for hydroponic plant growth.

Another object of the invention is to provide a hydroponic plant support medium or substrate that includes one or more of the following advantages over mineral wool and other substrate materials: better performance, more cost effective, and less environmental impact.

BRIEF DESCRIPTION OF THE DRAWINGS

The accompanying drawings, which are incorporated herein and form part of the specification, illustrate some, but not the only or exclusive, example embodiments and/or features. It is intended that the embodiments and figures disclosed herein are to be considered illustrative rather than limiting.

In the drawings.

DETAILED DESCRIPTION OF EXAMPLE EMBODIMENTS

Figure 1:
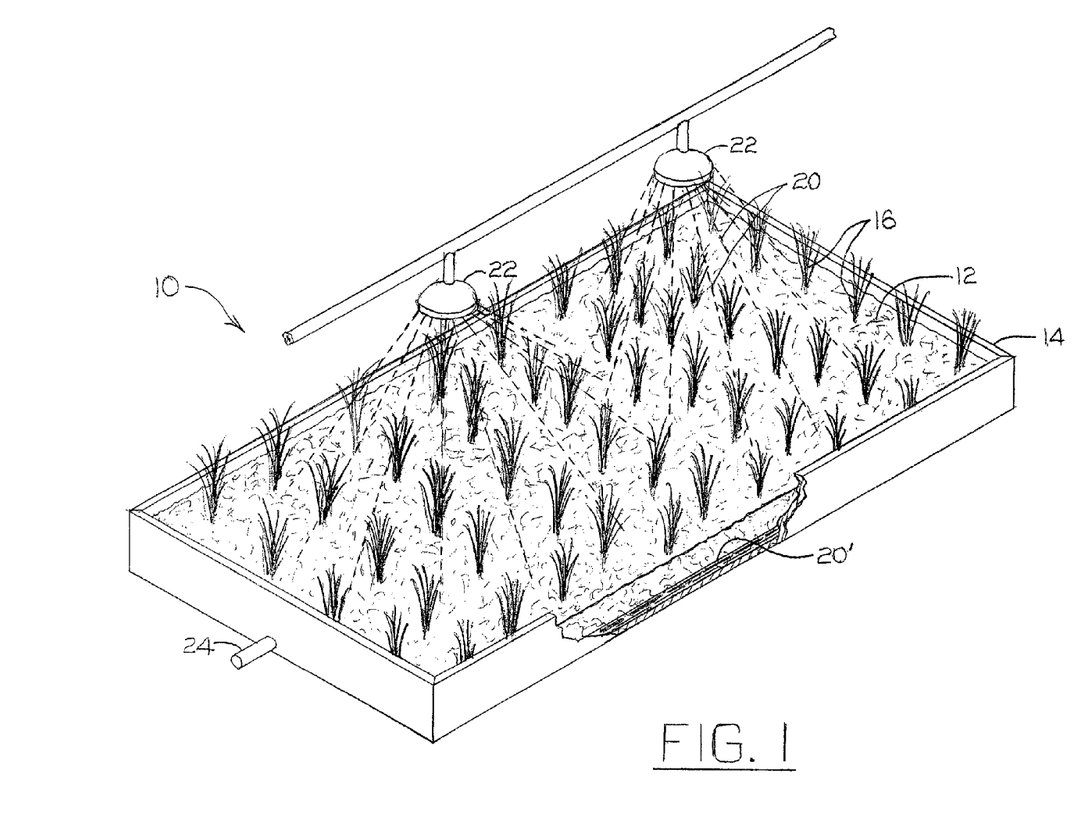
FIG. 1 is an isometric, diagrammatic view of an example hydroponic growing system utilizing activated carbon and/or just carbonized fiber growing medium or substrate.

An example hydroponic plant growth system 10, which has an example plant substrate 12 positioned in a reservoir 14, is shown in FIG. 1 as a diagrammatic illustration of one example implementation of the invention, but recognizing that the invention recited in the claims below can also be implemented in myriad other ways, once the principles are understood from the description herein. The example hydroponic plant growth system 10 is shown only as a way of providing example context for the description of a plant substrate 12 comprising activated carbon and/or just carbonized fibers according to this invention, but not to limit the scope, composition, structure, fabrication, or use of the plant substrate 12 in any way.

As mentioned above, the plant substrate 12 is illustrated in FIG. 1 as being positioned in a shallow reservoir 14 for use as a hydroponic plant substrate and growing medium, which, in this illustration, shows a plurality of plants 16 growing in the medium provided by the substrate 12 and wetted by a liquid mineral nutrient solution 20 provided in this example by overhead spray heads 22. Also, in this example, the liquid mineral nutrient solution 20 may, but does not have to, pool as indicated at 20' at the bottom of the reservoir 14 after seeping down through the plant substrate 12, from where it can be wicked back up by the plant substrate 12 to roots of plants 16 growing in the plant substrate 12. Excess and/or spent liquid mineral nutrient solution 20 can be drained from the reservoir 14 via a drain pipe 24, if desired. However, as mentioned above, the plant substrate 12 can be used in any of myriad hydroponic plant growth systems and configurations, including any kind of system for wetting the substrate 12 with mineral nutrient solution to grow plants. For example, any kind of static solution culture, continuous flow culture, passive sub-irrigation, ebb and flow or flood and drain sub-irrigation, top irrigation, deep water culture, or even aeroponic and aquaponic systems, all of which are familiar to persons skilled in the art and need not be described here for an understanding of the plant substrate 12. Therefore, the term hydroponic or hydroponic system as used herein can apply to any of those or other kinds of systems in which a substrate is wetted with nutrients for the primary or secondary purpose of growing plants. Also, nutrient solutions are well-known to persons skilled in the art, who also know how to formulate and/or provide the solution ingredients to suit particular plants and growing environments. Therefore, it is also not necessary to further describe or explain nutrient solutions for an understanding of this invention.

The plants 16 can be started from seeds placed in or on the plant substrate 12, or the plants 16 can be transplanted into the plant substrate 12. As the plants 16 derive their nutrients from the growth medium comprising the nutrient solution 20 in the plant substrate 12, they grow above the substrate 12 as their roots grow into the substrate 12 to anchor the plants 16 and to contact the nutrient solution 20. Therefore, the substrate 12 provides the mechanical support for the plant 16 as the roots take in nutrients from the nutrient solution 20, and the activated carbon fiber substrate 12 can retain both the nutrient solution 20 and air to put them into contact with the plant roots. In aeroponic applications, the roots can extend below the substrate material into an air space (not shown) comprising a nebulized spray or vapor of the nutrient solution.

The substrate 12, comprising activated carbon and/or just carbonized fibers with or without some additional non-carbonized, non-activated carbon fibers, provides particular characteristics and advantages for hydroponic growth of plants, including, but not limited to, a very porous structure that provides vast surface area for excellent water retention, which holds the nutrient solution 20 in close contact with the roots of the plants 16, as well as air retention. Activated carbon fibers are well-known, so it is not necessary to describe in detail how they are made. Suffice it to say that fibrous cellulose materials are carbonized by heating, usually in a low-oxygen or inert atmosphere, to remove non-carbon materials, and then raising the temperature to expand or "activate" the carbonized fibers to yield high porosity carbon fibers. For example, but not for limitation, the initial heating, i.e., carbonizing, step to drive off volatile, non-carbon materials can be in a mid-range of about 450-700° C. (e.g., about 500° C.), and the activation temperature can be in a higher range of about 900-1,200° C., though generally at about 700-800° C., with an average holding time of about 30-180 minutes. Since heating to activate the carbon fibers will also drive off volatile, non-carbon materials, or carbonizing is a first step toward activating the carbon fibers, the term activated carbon fibers in this description is considered to be a subset of carbonized fibers. Therefore, in this description, activated carbon fibers are considered to be carbonized fibers, although carbonized fibers may or may not be also activated. An example activated carbon fiber manufacturing process is described, for example, in published U.S. patent application, publication number 2007/0021300 A1, which is incorporated herein by reference. The carbonized fibers and activated carbon fibers are also pH neutral, which is a significant advantage over mineral wool substrate materials for hydroponic systems, and they are naturally hydrophilic, which helps to draw water and the nutrient solution by capillary action or wicking into the substrate and holding it there for contact by the plant roots. Also, even though the carbonized fibers and activated carbon fibers are biologic materials, they are biodegradable and can be composted for disposal; the carbonization process also sterilizes them.

Cellulose fibers derived from bamboo by mechanically crushing the bamboo into cellulose fiber material and then carbonizing and activating, as explained above, provides a particularly suitable activated carbon and/or just carbonized fiber material for the hydroponic plant substrate 12, although other cellulose fiber materials can also be used. Carbonized and activated carbon fibers from bamboo may have fiber diameters in the nanometer range, although smaller and larger diameter ranges may also be suitable for hydroponic applications, and they have large internal surface area due to the presence of micropore width (<2 nm diameter), mesopore (2-50 nm diameter), and macropores (>50 nm). The combined internal pore volume is generally in the range of about 0.1 to 1.0 $cm^3/g$. These inner or pore surfaces naturally retain water. Also, activated carbon does not filter inorganics, although it removes inorganic solutes from solution. However, that process is reversible, as water can redissolve these solutes. Therefore, the plant nutrients deposit into the pores and onto the outer surface of the fibers between watering cycles, and the trapped water and nutrients are accessible to the plant roots and redissolve into solution during subseqent watering cycles. During watering cycles, when the substrate is flooded, some of the pores do not fill with water; the highly textured surfaces of the fibers trap air throughout the substrate, allowing the roots uninterrupted access to oxygen.

Analytical measurements of air-holding capacity were made with cubes of activated carbon fiber and carbonized carbon fiber substrate material of known volume, submerged in a graduated cylinder with an inch of water above the top surface of the top cube. The water was degassed under vacuum, and the volume difference was observed. Both activated carbon fibers and carbonized carbon fibers performed identically, retaining 20% air by volume. These cubes took several minutes to degas at 27 mmHg, compared to Rockwool, which retained less than 5% air in submerged condition and degassed in under 15 seconds.

Though slabs remain in a submerged condition only for brief periods (for example, when the pump fills the slab with nutrient medium and the draining has yet to begin), Rockwool underperforms at these moments by stressing the plant with hypoxia caused by its inherent difficulty with air retention. Good aeration of the roots is widely regarded as the main advantage of aeroponics, and from all the soilless cultivation methods, its results speak for themselves by dwarfing examples from other methods. Optimal aeration is important for superior results. Strong air retention under all practical conditions is an advantage of carbonized carbon fibers and/or activated carbon fibers over prior art media.

The surface features and pore structure of activated (and/or simply carbonized) carbon fiber act as a buffer that helps to maintain optimal steady state conditions of air, water and nutrients for plant growth throughout watering cycles, even with infrequent watering. The plants continue to have access to water and nutrients that are retained in the activated and/or carbonized fibers even after the activated and/or carbonized carbon fiber slabs are drained for extended periods—sometimes two days or more—which protect plants during equipment failures and power outages. In contrast, equipment failure or power outages with prior art growth media can be catastrophic within several hours, since many plants may not survive.

Optimal steady state is easily achievable with activated or simply carbonized carbon fiber slabs to provide the plants with conditions similar to those in good soil cultures, where transitions from one condition to another are slow and shortages of nutrients, air, or water are nonexistent. No prior art substrate for hydroponic plant growth has achieved any steady state conditions. Consequently, hydroponic techniques and methods that use conventional prior art plant growth substrates have evolved around methods to compensate for these flaws. For example, very frequent watering cycles are used in attempts to compensate for poor water retention properties of prior art substrates, or air pumps are used to aerate feed water in attempts to compensate for low air availability in prior art substrates during flooding. The ease of achieving steady state with activated and/or carbonized carbon fiber substrates is thus a major advantage over prior art substrates. Therefore, revisions of conventional hydroponic methods are anticipated as activated and/or carbonized carbon fiber substrates as described herein become known. For example, less frequent watering cycles and reducing the duty cycle of the nutrient solution air pump are feasible modifications when using activated and/or carbonized carbon fiber substrates. Also, reducing the dissolved oxygen in nutrient media is feasible with activated and/or carbonized carbon fiber substrates, which would decrease the chances of algae infestations, since high oxygen content in water encourages rapid propagation of algae. Algae is a common problem in hydroponics, which decreases crop yields, clogs supply lines, and is often difficult to eradicate once the infestation occurs.

The carbonization process improves tensile strength of the fibers, and the activation process not only provides additional porosity, but also imparts increased durability to the material, so that it does not biodegrade as fast as raw cellulose materials, while a significant advantage of activated carbon and/or just carbonized fiber material for hydroponic plant substrate use over some other plant substrate materials, especially over mineral wool, is that it does biodegrade. This characteristic is beneficial for composting and disposal of the substrate 12 in an environmentally friendly manner. Other, non-carbonized, organic materials, such as non-carbonized and non-activated coconut husk fibers and peat, decompose too quickly, and as they decompose, their characteristics, especially in terms of water adsorption, change, which requires adjustments of nutrient composition and watering schedules, whereas the activated carbon and/or just carbonized substrate 12 does decompose, but not too quickly. Therefore, it has high durability that provides consistent performance characteristics throughout a grow cycle of the plants 16.

If desired, the biodegradable characteristic of the plant substrate material 12 can be adjusted by blending the carbonized fiber material and/or the activated carbon fiber material with some ordinary, non-carbonized, non-activated, organic fiber material. For example, ordinary bamboo fibers, coconut husk fibers, peat, or other cellulosic or synthetic carbon or organic fiber material can be blended with the activated carbon and/or just carbonized fibers to somewhat increase biodegradability of the fiber mass. Such blending can also reduce cost of the activated carbon and/or just carbonized fiber substrate 12. While any amount of activated carbon and/or carbonized fibers blended with non-carbonized, non-activated organic fiber material is beneficial, it is believed that users may prefer the activated carbon and/or carbonized fiber content of the substrate 12 to be at least twenty percent by weight. For example, but not for limitation, blending activated carbon fiber with ordinary cellulosic fiber material to have an activated carbon fiber content to ordinary cellulosic fiber content ratio in the range of about 1:4 to 1:1 can provide a good balance of durability and biodegradability for the plant substrate 12, although 100 percent activated carbon and/or carbonized fiber is very satisfactory and beneficial for most applications.

As mentioned above, the bamboo or other carbon fibers can be just carbonized without activation, if desired, although some amount of activation may still occur during carbonization. The short heating cycle required for just carbonizing and not intentionally activating the raw bamboo fiber will leave some of the bamboo fiber raw, thus achieving a balance between durability and biodegradability, while providing the desired properties of air and water retention. Since carbonizing, but not necessarily activating, the carbon fibers reduces manufacturing cost significantly as compared to activating, without compromising performance significantly, it is feasible, and, for many applications, it may be desirable to include carbonized carbon fibers that have not been activated. Such carbonized, but not activated, carbon fibers can be included in a substrate either with or without activated carbon fibers.

As mentioned above, the activated carbon fiber material or, optionally, just carbonized carbon fiber material, or both, can be manufactured from bamboo or any other suitable cellulosic or synthetic (e.g., viscose or polyacrylonitrile) carbon fibers and with any convenient activated carbon and/or just carbonized carbon fiber manufacturing method known to persons skilled in the art. The activated carbon and/or just carbonized carbon fiber material can be formed into any convenient or desired shape and size for substrates 16 by conventional methods for fibrous materials. For example, but not for limitation, the activated carbon fibers can be formed into sheets or webs by the techniques developed for non-woven textiles, such as felts or other staple non-wovens, spunlaid non-wovens, or other non-woven materials, e.g., by putting the fibers together in the form of a sheet or web and then binding them either mechanically, as by pressure or by penetration with serrated needles for interlocking the fibers or thermally with binders that melt into the web by increasing temperature, or by mixing the fibers with water into a slurry of suspended fibers in the water and depositing the slurry into molds or slabs for drying. Such non-woven manufacturing techniques are well-known to persons skilled in that art.

Figure 2:
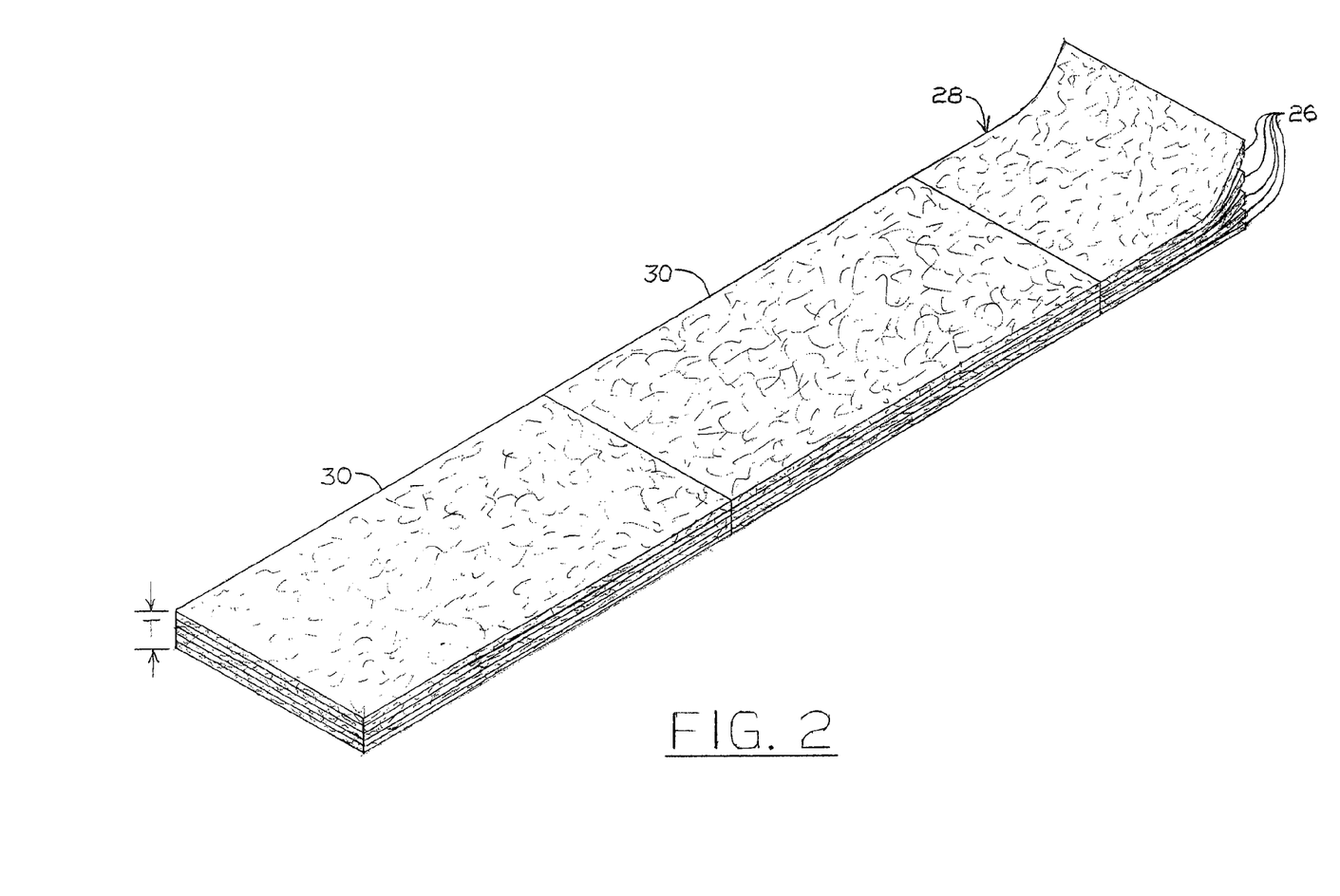
FIG. 2 is an isometric, diagrammatic view of an example blanket of activated carbon and/or just carbonized fibers cut into slabs for use in hydroponic growing systems.

The non-woven sheets or webs of activated carbon fibers can be formed or compiled and packaged in any convenient arrangement or configuration. As shown, for example, in FIG. 2, the non-woven sheets or webs 26 of activated carbon fiber material can be layered into a thicker pad or blanket 28 in whatever thickness T is desired for a particular application. Typical thicknesses for hydroponic plant substrates 12, for example, but not for limitation, may be in a range of about one inch (2.5 cm) to six inches (15.3 cm). The pad 28 can then be cut into slabs 30 of the activated carbon fiber material in whatever lengths or other dimensions desired. The slabs 30 can then be wrapped, if desired, for example, in polyethylene film (not shown) or other wrapping material to protect them and keep them sterile during shipping. The activated carbon fibers can be pressed into whatever density is desired for particular application or performance requirements, such as how much water they can retain. For example, density of the substrate 12 in the range of 40 to 150 kilograms per cubic meter ($Kg/m^3$) provides good to excellent hydroponic performance, although 2 to 250 $Kg/m^3$ provides satisfactory results. Also, as mentioned above, they can be mixed with other fibers, organic or inorganic, and, if necessary, they can be sprayed with polymeric resins to enhance strength and durability.

Figure 3:
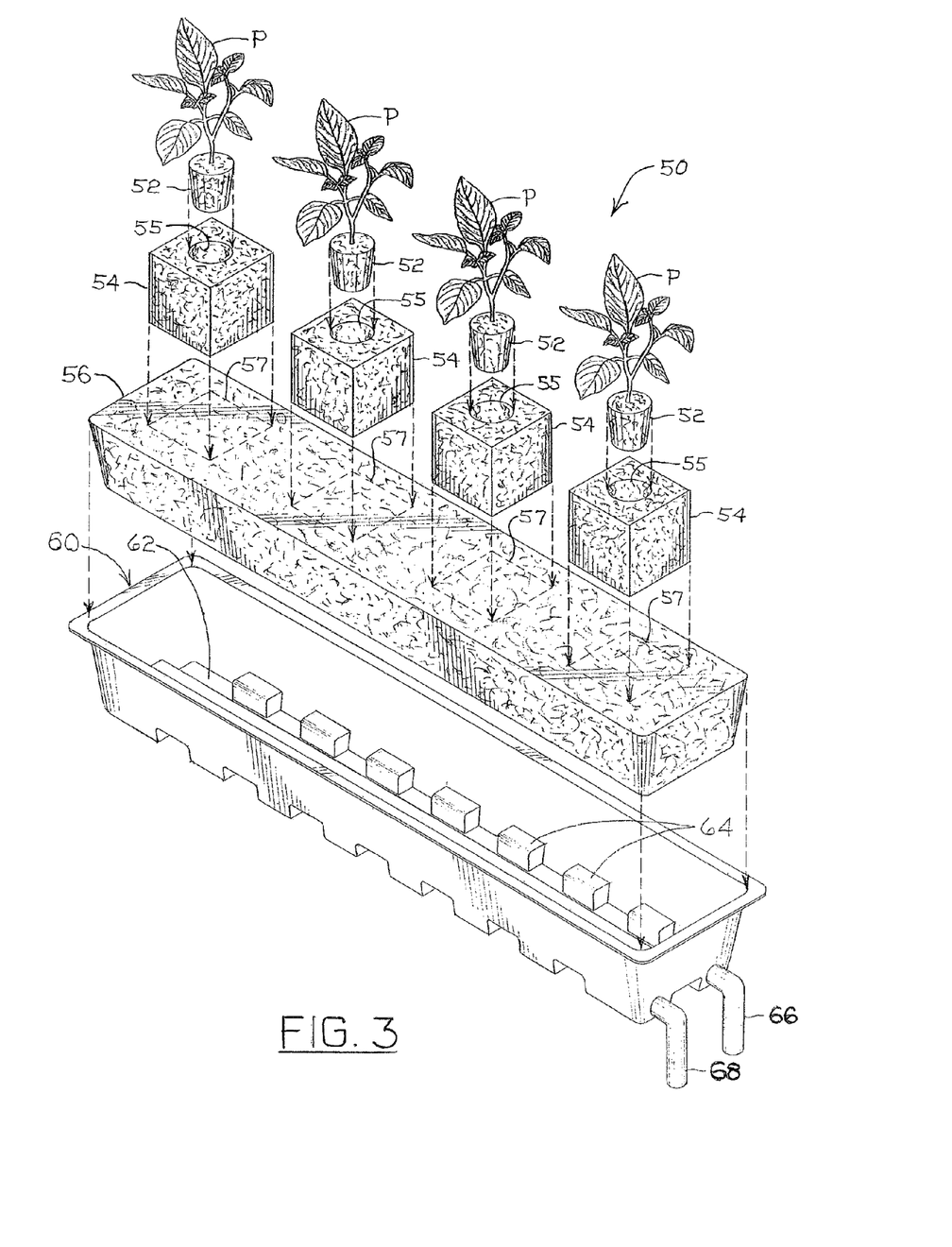
FIG. 3 is an isometric view of the components of another example hydroponic growing system (shown pre-assembly) that utilizes a carbon growing medium or substrate comprising molded activated carbon and/or carbonized fiber material.

Alternatively, the activated carbon and/or just carbonized carbon fiber material can be wetted and deposited into molds for shaping into any desired shape, for example, pots, trays, or trough shaped configurations, suitable for planting seedlings or clones as shown, for example, in FIG. 3. The example hydroponic plant growth assembly 50 illustrated in FIG. 3 includes several plant growing substrates 52, 54, 56 of activated carbon fibers and/or just carbonized carbon fiber material with or without non-carbonized cellulosic or synthetic carbon material in various shapes and sizes that together with a tray 60 comprise a hydroponic growth system for plants P. This assembly 50 comprising starting plug substrates 52, intermediate block substrates 54, and finishing slab substrate 56 together with the tray 60 is not unique to this invention, but it is shown to illustrate several example molded hydroponic growth media or substrates out of myriad other possible molded shapes (not shown) that can be made with the activated carbon and/or just carbonized carbon fiber material (with or without non-carbonized, non-activated carbon fibers) described above. As mentioned above, the activated carbon and/or just carbonized carbon fibers, with or without non-activated, non-carbonized cellulosic or synthetic carbon fibers, can be mixed with water into a slurry and deposited into molds (not shown) of any desired sizes and shapes. The slurry is then dried in the molds to solidify the fibrous mass into the molded size and shape, which is then removed from the molds and packaged for shipping or storage.

Essentially, the plants P can be started from seeds planted in the molded, frustroconical-shaped, plug substrates 52 that can be kept moist in any convenient manner. After growing to a certain size, the plants P in the plug substrates 52 can be planted in the molded, cube-shaped, block substrates 54 by inserting the plug substrates 52 into the holes 55 in the block substrates 54, as indicated by the broken line arrows. The plant P can be grown in the block substrates 54 for a time, separate from the elongated slab substrate 56, for example, by setting them in a different tray (not shown), for example, similar to the reservoir 14 in FIG. 1, for feeding hydroponically until the plant roots begin to fill the block substrate 54. Then, the plant P in the block substrate 54 can be set on the molded, elongated slab substrate 56, as indicated by the broken line outlines 57 on the slab substrate 56 to finish its later growth stage, as its roots penetrate and grow into the larger slab substrate 56. The elongated slab substrate 56 is sized and shaped to fit in the tray 60, where it is supported above the bottom 62 by raised platforms or supports 64, although it can be just set on the bottom 62.

A liquid nutrient medium or solution (not shown in FIG. 3) is pumped into the tray 60 through a feed tube 66 and bottom drained through drain tube 68 in cycles to alternately wet/feed and aerate the hydroponic growing slab substrate 56. The roots of the plant P penetrate and grow into slab substrate 56, and some of the liquid nutrient solution is wicked, i.e., drawn by capillary action, from the slab substrate 56 into the block substrates 54 and plug substrates 52. The plants P can be grown to maturity in these substrates 52, 54, 56 and then harvested. Usually, many of these assemblies 50 are used side-by-side in larger hydroponic plant growing operations.

Also, drip systems and/or spray or other irrigation systems can be used to deliver the liquid nutrient medium to the substrates 52, 54, 56 instead of the feed tube 66.

As mentioned above, these and other shaped and sized molded, hydroponic plant growth substrates, which are known and used in hydroponic plant growth systems, can be made with activated carbon and/or just carbonized carbon fibers. Essentially, the activated carbon and/or just carbonized carbon fibers, with or without non-activated, non-carbonized, cellulosic or synthetic carbon fibers, are mixed with water into a slurry of suspended fibers in water. The slurry is deposited into molds (not shown) of any desired shapes and sizes and allowed to dry into solid masses of intertwined fibrous material. When the dried masses of intertwined fibrous material are removed from the molds, they retain the shapes and sizes of the molds.

Alternatively, the slurry of fibrous material, if made thick enough, can be poured onto a large surface and allowed to dry in a solid slab (not shown) of intertwined fibers. The slab can then be cut into desired shapes and sizes, for example, into the cubic block substrates 54 and slab substrate 56 in FIG. 3.

Of course, weaving technologies and techniques, instead of non-woven technologies and molding, can also be used to form the activated carbon fibers into sheets or webs, which may have structural advantages for some applications, for example, aeroponics, but weaving is generally more expensive than non-woven and molding techniques. Any other method or technique that puts the activated carbon fibers into either slabs or bulk material masses that are usable for hydroponic plant substrates for growing plants can also be used. Ordinarily, for typical hydroponic substrate uses, however, the cellulose fiber material may be minimally carbonized and activated without binder material (for example, carbonized at about 500° C. and activated at about 700-800° C. held for about fifteen minutes), formed into sheets or webs, laminated into blankets, and cut into slabs or molded into shapes, as described above, packaged and shipped without further processing. The hydroponic growth substrates made from or with the sheets, webs, blankets, slabs, or molded shapes can be wrapped in plastic for shipping and storage, and when used, some of the plastic may be left in place to prolong wetness and inhibit drying of the substrates during plant growth.

The activated carbon fiber substrates or plant growth media also have advantages over other media for aquaculture applications. Aquaculture is another method of soilless agriculture. A basic example of aquaculture comprises a tank of fish that are fed food suitable for the species being raised, and its urine and excrement, along with the fish tank water, which make up the nutrient medium for plants, is circulated into adjacent tanks containing plants, where the nutrient medium contacts the roots and the nutrients get absorbed. Clean water is then returned to the fish tank.

This method of generating plant nutrients in situ is appealing, but introduces a complicated set of problems not encountered in other methods of soilless cultivation. Aquaculture is a symbiotic relationship between fish (or other aquatic animals), bacteria, and plants, wherein each plays a vital role, without which everything perishes. The fish generate nutrients for the plants to consume, but they also generate ammonia, which is toxic to them above a certain concentration. The bacteria metabolize ammonia to nitrites and nitrates which the plants consume. The plants act as a bio-filter, cleaning the water by removing the waste materials of both the fish and the bacteria.

More than half of the waste produced by fish is urine and secretions from blood across the gill membrane in the form of ammonia, which exists as the ammonium ion in water. The most important bacteria involved in aquaculture are the nitrogen fixing kind, such as *Nitrosomonas*, which convert ammonia to nitrites, and *Nitrobacter* which convert nitrites to nitrates. Other bacteria participate in this system, for example Heterotrophic bacteria such as *Bacillus, Pseudomonas*, or *Escherichia* which convert some of solid fish waste into ammonia through a process called "Mineralization", which is an important mechanism in biodegradation that can metabolize most organic waste, including plant and animal tissue. For this reason, the activated carbon fiber substrates are better suited for aquaponics or aquaculture applications than carbonized carbon fiber.

The microorganism generally take time to populate a large scale operation, and, in order to achieve the optimal balance of the critical nitrogen fixing species, the aquaculturalist may start with a limited number of fish and allow the bacteria biomass to expand at a manageable rate. Attempting to start with a large number of fish may not be successful, unless expert control of microorganisms is implemented, such as growing specific bacteria in shaker cultures and adding them to the tanks. Otherwise problems like overpopulation by Heterotrophs can occur. These organisms can double in population every 15 minutes, so they can multiply so quickly as to deplete the food supply and kill the whole system, fish and all, if not controlled. A convenient way to save weeks or months of time while avoiding catastrophic outcomes is by re-using activated carbon fiber substrate slabs in a new tank after plants have been harvested. This method will greatly speed up the process by effectively transplanting the already established "multicultural" microbial population into a situation with the same species of fish and the same species of plants, sometimes even genetically equivalent clones. Although it is also possible to populate a new tank by taking some water from an established aquaponics system, the technique of transplanting a "populated" activated carbon fiber substrate is orders of magnitude more effective due to several important advantages inherent to the material. The macropores in activated carbon fibers are an ideal size to house a single bacterium per pore, and the movement of the water through slabs will immobilize them in this way. Once immobilized, they may simply wait for the water to deliver ammonium ions to them, which they metabolize into nitrates or nitrites and release them in close proximity to the roots of the plants, since they both inhabit the substrate. Also, the activated carbon fibers offer enormous surface area available for bacteria to adhere to, and the roots also provide suitable surfaces. Because the activated carbon fiber substrates also act as filters (explained below), they will contain trapped solid organic matter from the water, which will attract the Heterotrophic bacteria populations; thus becoming the active sites of mineralization. The activated carbon fiber substrate slab therefore houses all the critical bacteria populations in a convenient format for transplanting, which illustrates another advantage of activated carbon fiber substrates.

The following example illustrates how the process can be enhanced by the filtration properties of activated carbon fibers while they function as a substrate. In order to use the activated carbon fiber slabs as filters, the mixture of water, dissolved ions, and suspended organic matter comprising the nutrient medium in aquaculture must pass through the slab, so the substrates are supplied with nutrient medium at the top of the slab. An overhead nutrient solution delivery device, for example as shown in FIG. 1, wherein spray heads 22 are positioned above the slab 12 can be used. However, in aquaculture systems the spray heads 22 should be positioned in fairly close proximity to the top surface of the substrate 12 to avoid spraying bacteria and nutrient solution on the plants and leaves. The substrate slabs 12 may be supported above the bottom of the reservoir or tank 14, for example, in a manner similar to the way the slab 56 in FIG. 3 is supported above the bottom 62 of the tray 60 by raised platforms or supports 64, which allows the substrates or slabs 12, 56 to function as gravity filtration devices.

Prior art aquaponic systems have to either leave suspended organic matter in the water in order to benefit plant nutrition, which has the disadvantage of hindering the fish, or use an inline filter or clarifier (such as a centrifugal separator similar to what is typically used upstream from irrigation pumps to remove silt in agricultural irrigation systems), which allows higher production of fish but requires nutrient supplementation to sustain the plants. The latter is the most common commercial system, which is necessary to avoid clogging of supply lines and unhealthy fish. However, clarifying the water of a large percentage, e.g., 40 to 60%, of the nutrients and discarding them is wasteful and detracts from the overall efficiency of the operation. The only prior art system that attempts to filter the solids without discarding them is the gravel bed method that uses crushed rock as a plant substrate, which traps solids with reasonable efficiency, but the plant yield is low due to poor aeration of the roots, which causes chronic hypoxia since the roots are submerged for a high percentage of the time.

Using activated carbon fiber substrate slabs 14, 56 as gravity filters, as explained above, avoids all of those disadvantages by filtering the suspended organic solids at the roots of the plants, thereby allowing the plants to access the nutrients while providing an ideal habitat for beneficial bacteria. This ideal habitat encourages high population density by providing enormous surface area per unit of volume, and the activated carbon fiber substrate provides a convenient way to populate additional tanks with these beneficial bacterial species in optimal proportions with prodigious populations via transplantation of used substrate slabs 14, 56 to new tanks, as explained above. All of these advantages make activated carbon fiber an ideal substrate for aquaponics and aquaculture applications.

While a number of exemplary aspects and embodiments have been discussed above, persons of skill in the art will recognize certain modifications, permutations, additions and sub-combinations thereof. It is therefore intended that the following appended claims, as well as additional claims that may be hereafter introduced, are interpreted to include all such modifications, permutations, additions and sub-combinations as are within their true spirit and scope. The words "comprise," "comprises," "comprising," "composed," "composes," "composing," "include," "including," and "includes" when used in this specification, including the claims, are intended to specify the presence of stated features, integers, components, or steps, but they do not preclude the presence or addition of one or more other features, integers, components, steps, or groups thereof. Hydroponic refers to all kinds of soilless growth systems including hydroponic, aeroponic, and aquaculture or aquaponic growth systems, for convenience and to avoid unnecessary repetition.

The invention and several embodiments in which an exclusive property or privilege is claimed are defined as follows:

1. A method of growing plants hydroponically including:
   providing a plant support substrate comprising carbonized fibers;
   planting seeds or the plants on or in the substrate; and
   supplying a mineral nutrient solution to the substrate.

2. The method of claim 1, wherein the plant support substrate includes activated carbon fibers.

3. The method of claim 1, wherein the plant support substrate also includes non-carbonized cellulosic or synthetic carbon fiber material blended with the carbonized fibers.

4. The method of claim 1, wherein the carbonized fibers are made from bamboo fibers.

5. The method of claim 3, wherein the non-carbonized cellulosic fiber material includes bamboo fibers.

6. The method of claim 2, wherein the activated carbon fibers have micro-, meso-, and macro-pores.

7. A method of growing a plant, comprising:
contacting the plant with a substrate comprising carbonized fibers; and
wetting the carbonized fibers in the substrate with a mineral nutrient solution.

8. The method of claim 7, wherein the substrate comprises activated carbon fibers produced by carbonizing and then activating cellulosic or synthetic carbon fibers.

9. The method of claim 8, wherein the carbon fibers include bamboo fibers.

10. The method of claim 7, wherein the substrate includes non-carbonated, non-activated, carbon fibers.

11. The method of claim 7, wherein the non-carbonated, non-activated, cellulosic fibers include bamboo cellulosic fibers.

12. The method of claim 10, wherein the carbonized fiber content of the substrate is at least twenty percent of the substrate by weight.

13. Hydroponic plant growing apparatus, comprising:
substrate material comprising carbonized fiber; and
mineral nutrient solution delivery means for wetting the substrate material with mineral nutrient solution.

14. The hydroponic plant growing apparatus of claim 13, wherein the carbonized fiber content of the substrate material is at least twenty percent by weight.

15. The hydroponic plant growing apparatus of claim 13, wherein the substrate material includes activated carbon fibers.

16. The hydroponic plant growing apparatus of claim 13, wherein the substrate includes non-carbonized, non-activated, cellulosic fibers.

17. The hydroponic plant growing apparatus of claim 16, wherein the ratio of carbonized fiber content to non-carbonized, non-activated, cellulosic fiber content is in a range of 1:4 to 1:1.

18. The hydroponic plant growing apparatus of claim 15, wherein the activated carbon fiber includes activated carbon fiber made from bamboo cellulosic fiber.

19. The hydroponic plant growing apparatus of claim 16, wherein the non-carbonized, non-activated, cellulosic fibers includes bamboo cellulosic fibers.

20. A hydroponic plant growing substrate comprising:
carbonized fibers and non-carbonized, non-activated, cellulosic or synthetic carbon fibers, wherein the carbonized fiber content is at least twenty percent by weight of the substrate.

21. The hydroponic plant growing substrate of claim 20, wherein the ratio of carbonized fiber content to non-carbonized, non-activated, cellulosic fiber content is in a range of 1:4 to 1:1.

22. The hydroponic plant growing substrate of claim 20, wherein the carbonized fibers include activated carbon fibers.

23. The hydroponic plant growing substrate of claim 20, wherein the carbonized fibers comprise carbonated fibers made from bamboo cellulosic fibers.

24. The hydroponic plant growing substrate of claim 20, wherein the non-carbonized, non-activated, cellulosic fibers include bamboo cellulosic fibers.

* * * * *